(12) United States Patent
Nazemi

(10) Patent No.: US 9,936,106 B2
(45) Date of Patent: Apr. 3, 2018

(54) PIXEL NON-UNIFORMITY CORRECTION

(71) Applicant: Sensors Unlimited, Inc., Princeton, NJ (US)

(72) Inventor: Jonathan Nazemi, Doylestown, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 208 days.

(21) Appl. No.: 14/939,449

(22) Filed: Nov. 12, 2015

(65) Prior Publication Data

US 2017/0142297 A1  May 18, 2017

(51) Int. Cl.
*H04N 5/217* (2011.01)
*H04N 5/30* (2006.01)
*H04N 5/365* (2011.01)
*H04N 5/33* (2006.01)

(52) U.S. Cl.
CPC ............ *H04N 5/2176* (2013.01); *H04N 5/33* (2013.01); *H04N 5/3651* (2013.01)

(58) Field of Classification Search
None
See application file for complete search history.

(56) References Cited

U.S. PATENT DOCUMENTS

| | | |
|---|---|---|
| 4,587,563 A | 5/1986 | Bendell et al. |
| 6,504,155 B1 | 1/2003 | Ookawa |
| 6,891,160 B2 | 5/2005 | Kaufman et al. |
| 7,235,785 B2 | 6/2007 | Hornback et al. |

(Continued)

FOREIGN PATENT DOCUMENTS

| | | | |
|---|---|---|---|
| EP | 1130907 A2 * | 9/2001 | ............... H04N 5/33 |
| EP | 1130907 A2 | 9/2001 | |

OTHER PUBLICATIONS

Yu et al., "A New CMOS Readout Circuit for Uncooled Bolometric Infrared Focal Plane Arrays", ISCAS 2000—IEEE International Symposium on Circuits and Systems, May 28-31, 2000, Geneva, Switzerland.*

(Continued)

*Primary Examiner* — William C Vaughn, Jr.
*Assistant Examiner* — Joseph A Towe
(74) *Attorney, Agent, or Firm* — Locke Lord LLP; Scott D. Wofsy; Joshua L. Jones

(57) ABSTRACT

A method of correcting pixel non-uniformity for varying temperature includes determining an FPA temperature and calculating a non-uniformity correction map on a pixel by pixel basis for the FPA, wherein the non-uniformity correction for each pixel is a function of the FPA temperature and empirically derived coefficients. The method also includes applying the non-uniformity correction map at the FPA temperature to condition output of the FPA to produce temperature dependent non-uniformity corrected image data. An imaging system includes a focal plane array (FPA). A temperature sensor is operatively connected to measure FPA temperature. A module is operatively connected to the FPA and temperature sensor to calculate and apply a non-uniformity correction map as described above. There need be no temperature control device for the FPA. The FPA can include a buffered current mirror pixel architecture, and can include an InGaAs material for infrared imaging.

11 Claims, 1 Drawing Sheet

(56) References Cited

U.S. PATENT DOCUMENTS

| | | |
|---|---|---|
| 7,679,048 B1 | 3/2010 | Aziz et al. |
| 9,450,001 B2 * | 9/2016 | Albo .................. B82Y 20/00 |
| 2002/0166968 A1 | 11/2002 | Bradley |
| 2008/0179520 A1 | 7/2008 | Kauffman et al. |
| 2011/0108717 A1 * | 5/2011 | Olson ............... H01L 27/14649 |
| | | 250/252.1 |
| 2012/0050539 A1 | 3/2012 | Naimi et al. |
| 2014/0016844 A1 | 1/2014 | Afanasenko |
| 2014/0139643 A1 | 5/2014 | Hogasten et al. |
| 2014/0175591 A1 | 6/2014 | Tian et al. |
| 2014/0340154 A1 | 11/2014 | Lin |

OTHER PUBLICATIONS

Extended European Search Report dated Mar. 10, 2017, issued during the prosecution of European Patent Application No. 16198324.2 (8 pages).

\* cited by examiner

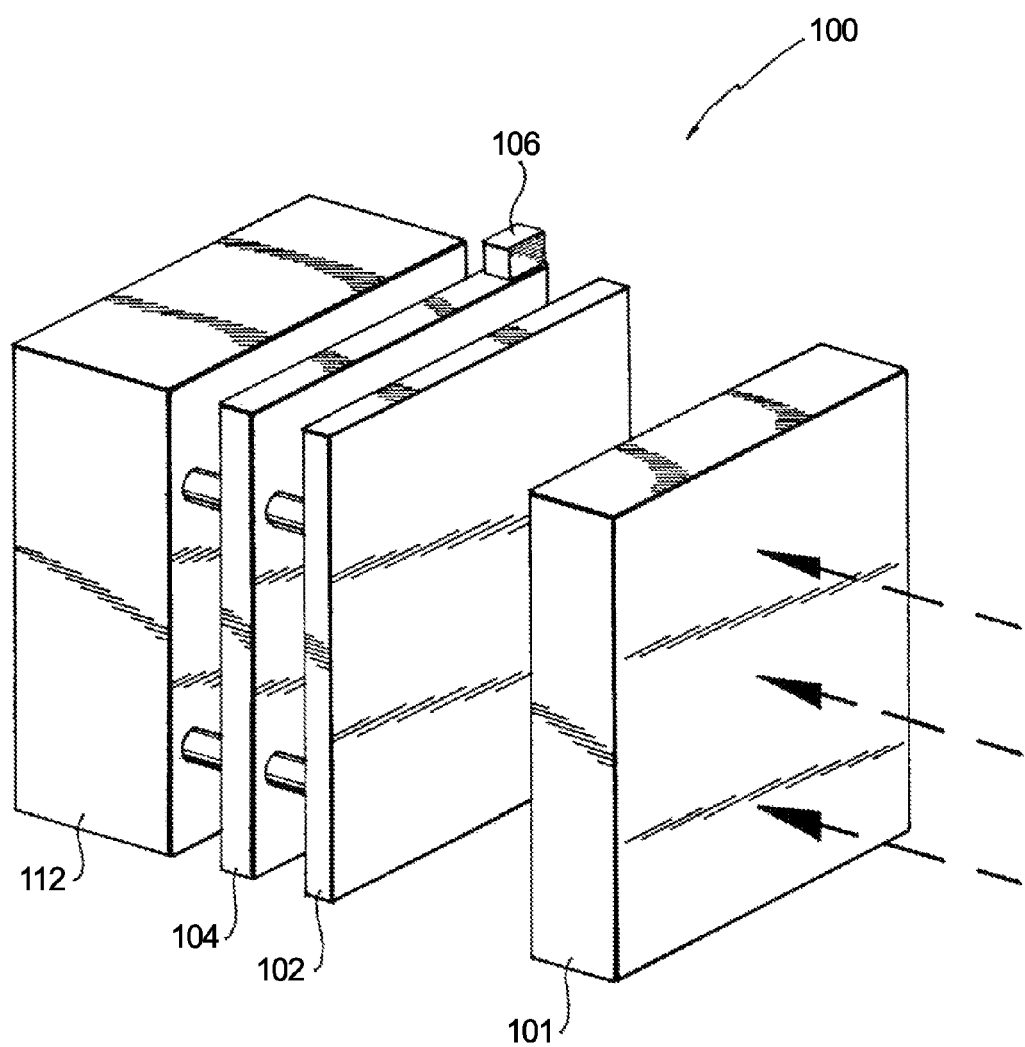

PIXEL NON-UNIFORMITY CORRECTION

STATEMENT REGARDING FEDERALLY SPONSORED RESEARCH OR DEVELOPMENT

This invention was made with government support under contract number N00014-14-C-0061 awarded by the United States Navy, and contracts number W15P7T-06-D-E402/53 and W15P7T-10-D-D413/R23G awarded through the Marine Corps Systems Command (MARCORSYSCOM). The government has certain rights in the invention.

BACKGROUND OF THE INVENTION

1. Field of the Invention

The present disclosure relates to imaging, and more particularly to focal plane arrays such as used in imaging systems.

2. Description of Related Art

A typical focal plane array (FPA) has pixel to pixel variation in behavior due to manufacturing variance and the like. This variation is typically addressed by calibrating each pixel and saving the pixel by pixel calibration data as a correction map used to correct signals from the pixels to produce accurate image data. Pixel performance varies as a function of temperature, and so the temperature at which the correction map is created is the temperature at which the system generates the most accurate images—changes in temperature at the FPA will reduce the effectiveness of the correction map. Non-uniformity is typically most acute at low light levels. A typical solution for this problem is to use thermoelectric cooling to control the temperature of the FPA. As long as the thermoelectric cooling maintains a constant, known temperature at the FPA, and using a correction map that corresponds to that known temperature, the FPA can be used to produce accurate image data regardless of ambient temperature.

Such conventional methods and systems have generally been considered satisfactory for their intended purpose. However, there is still a need in the art for improved imaging techniques. The present disclosure provides a solution for this need.

SUMMARY OF THE INVENTION

A method of correcting pixel non-uniformity for varying temperature includes determining an FPA temperature and calculating a non-uniformity correction map on a pixel by pixel basis for the FPA, wherein the non-uniformity correction for each pixel is a function of the FPA temperature and empirically derived coefficients. The method also includes applying the non-uniformity correction map to imaging data from the FPA to produce temperature dependent non-uniformity corrected image data.

Applying the non-uniformity correction map can be performed without controlling the temperature of the FPA. The function of the FPA temperature and empirically derived coefficients can incorporate approximating change in a respective pixel's dark level to a desired correction value based on the FPA temperature.

Calculating a non-uniformity correction map on a pixel by pixel basis, wherein the non-uniformity correction for each pixel is a function of the FPA temperature and empirically derived coefficients can be governed by $$\delta Ic = [p0 + p1 \times \log 10(T)] \times \left( Iraw - \sum_{n=0,1,3,5} \left( a_n \times \left( \frac{T - T_{min}}{T_{max} - T_{min}} \right)^n \right) \right)$$

wherein $\delta Ic$ represents the change for a respective pixel from its dark level to a desired correction value, T is the FPA temperature in digital numbers, Iraw is the raw value of the pixel in digital numbers, $T_{max}$ and $T_{min}$ are maximum and minimum temperatures, respectively, for normalizing temperature T, e.g., maximum and minimum operating temperatures, and p0, p1, and $a_0$, $a_1$, $a_3$, and $a_5$ are empirically derived coefficients.

An imaging system includes a focal plane array (FPA). A temperature sensor is operatively connected to measure FPA temperature. A module is operatively connected to the FPA and temperature sensor to calculate a non-uniformity correction map on a pixel by pixel basis as described above, and to apply the non-uniformity correction map to condition output of the FPA to produce temperature dependent non-uniformity corrected image data.

There need be no temperature control device, e.g., thermoelectric cooling device, connected for temperature control of the FPA. The FPA can include a buffered current mirror pixel architecture. It is also contemplated that the FPA can include an InGaAs material for infrared imaging.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein:

FIG. 1 is a schematic view of an exemplary embodiment of an imaging system constructed in accordance with the present disclosure, showing the focal plane array (FPA).

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. The systems and methods described herein can be used for accurate imaging using non-temperature controlled focal plane arrays.

Imaging system 100 includes a focal plane array (FPA) 102, and lens optics 101 for focusing images on FPA 102, as indicated by the three large arrows in FIG. 1. FPA 102 can be of any suitable array type, for example a two-dimensional array with a 240 by 612 grid of pixels. However, any other suitable array configuration, including one-dimensional arrays, can be used without departing from the scope of this disclosure.

A temperature sensor 106 is operatively connected to a Read-Out Integrated Circuit ROIC 104. As the FPA 102 and ROIC 104 are in relative temperature equilibrium, temperature sensor 106 provides sufficient temperature readings to accurately represent the temperature of FPA 102. ROIC 104 is operatively connected to FPA 102 to condition electrical signals from the array for imaging. A module 112 is operatively connected to ROIC 104. This module 112 provides electronic architecture such that the signals from ROIC 104 can be conditioned for signal output, analyzed with embedded logic such as that within a field programmable gate array (FPGA). Within module 112, the new control value VGain, gain voltage, is calculated based on input from ROIC 104. The new control value is then set in ROIC 104 to achieve the desired level of gain compensation. There need be no temperature control device, such as a thermoelectric cooling device, connected for temperature control of FPA 102. FPA 102 can include a buffered current mirror pixel architecture, or any other suitable architecture. It is also contemplated that FPA 102 can include an InGaAs material for infrared imaging.

A method of correcting pixel non-uniformity, e.g., in system 100, for varying temperature includes determining an FPA temperature, e.g., using sensor 106, and calculating a non-uniformity correction map on a pixel by pixel basis for the FPA, e.g., FPA 102, wherein the non-uniformity correction for each pixel is a function of the FPA temperature and empirically derived coefficients. The method also includes applying the non-uniformity correction map at the FPA temperature to condition output of the FPA to produce temperature dependent non-uniformity corrected image data, which can be output, e.g., by module 112.

Applying the non-uniformity correction map can be performed without controlling the temperature of the FPA 102. The function of the FPA temperature, system non-uniformity correction at the reference temperature, and empirically derived coefficients can incorporate approximating change in a respective pixel's dark level to a desired correction.

Traditional non-uniformity correction utilizes a model that corrects pixels from an absolute reference, meaning the pixel is corrected to be at a digital level for an input digital level and temperature pair. In contrast, the model used herein utilizes an approach that corrects a given pixel in a relative reference, meaning the pixel is corrected to minimize the difference from the normal. The change in gain from an offset is smooth and significantly easier to model. The following calculations are derived from a model that reduces or minimizes non-uniformity and number of calibration coefficients.

Calculating a non-uniformity correction map on a pixel by pixel basis, wherein the non-uniformity correction for each pixel is a function of the FPA temperature and empirically derived coefficients can be governed by $$\delta Ic = [p0 + p1 \times \log 10(T)] \times \left( Iraw - \sum_{n=0,1,3,5} \left( a_n \times \left( \frac{T - T_{min}}{T_{max} - T_{min}} \right)^n \right) \right)$$

wherein $\delta Ic$ represents the change for a respective pixel from its dark level to a desired correction value, T is the FPA temperature in digital numbers, Iraw is the raw value of the pixel in digital numbers, $T_{max}$ and $T_{min}$ are maximum and minimum temperatures, respectively, for normalizing temperature T, e.g., maximum and minimum operating temperatures, and p0, p1, and $a_0$, $a_1$, $a_3$, and $a_5$ are empirically derived coefficients.

Systems and methods as described herein can be used to correct pixel by pixel non-uniformity over a range of FPA temperatures and light levels. Potential advantages of utilizing systems and methods as disclosed herein include eliminating hardware for temperature control, such as thermoelectric cooling devices, from imaging systems. It is also contemplated that hybrid systems can be used, wherein temperature control only partially controls temperature of the FPA, in which case any remaining FPA temperature induced non-uniformity can be corrected using techniques as disclosed herein. Reducing or eliminating temperature control devices can remove a major contributor to power consumption and hardware size. It is also contemplated that if system gain corrections are made for temperature variation in non-temperature controlled (or partially non-temperature controlled) imaging systems, such corrections can advantageously reduce the digital footprint for non-uniformity corrections as disclosed herein.

The methods and systems of the present disclosure, as described above and shown in the drawings, provide for imaging systems with superior properties including reducing or eliminating the need for temperature control, while providing accurate imaging data over a range of ambient temperatures. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of correcting pixel non-uniformity for varying temperature comprising:
   determining a focal plane array (FPA) temperature;
   calculating a non-uniformity correction map on a pixel by pixel basis for the FPA, wherein non-uniformity correction for each pixel is a function of the FPA temperature and empirically derived coefficients; and
   applying the non-uniformity correction map to imaging data from the FPA to produce temperature dependent non-uniformity corrected image data, wherein calculating a non-uniformity correction map on a pixel by pixel basis, wherein the non-uniformity correction for each pixel is a function of the FPA temperature and empirically derived coefficients is governed by $$\delta Ic = [p0 + p1 \times \log 10(T)] \times \left( Iraw - \sum_{n=0,1,3,5} \left( a_n \times \left( \frac{T - T_{min}}{T_{max} - T_{min}} \right)^n \right) \right)$$

wherein $\delta Ic$ represents the change for a respective pixel from its dark level to a desired correction value, Iraw is the raw value of the pixel in digital numbers, $T_{max}$ and $T_{min}$ are maximum and minimum temperatures, respectively, for normalizing FPA temperature T, and p0, p1, and $a_0$, $a_1$, $a_3$, and $a_5$ are empirically derived coefficients.

2. The method as recited in claim 1, wherein applying the non-uniformity correction map is performed without controlling the temperature of the FPA.

3. The method as recited in claim 1, wherein the function of the FPA temperature and empirically derived coefficients incorporates approximating change in a respective pixel's level to a desired corrected value based on the FPA temperature.

4. The method as recited in claim 1, wherein the FPA includes a buffered current mirror pixel architecture.

5. The method as recited in claim 1, wherein the FPA includes an InGaAs material for infrared imaging.

6. An imaging system comprising:
   a focal plane array (FPA);

a temperature sensor operatively connected to measure FPA temperature; and a module operatively connected to the FPA and temperature sensor to apply a non-uniformity correction map on a pixel by pixel basis for the FPA as a function of the FPA temperature and empirically derived coefficients, and to apply the non-uniformity correction map to condition output of the FPA to produce temperature dependent non-uniformity corrected image data, wherein the module is configured to calculate the a non-uniformity correction map on a pixel by pixel basis for the FPA as a function of the FPA temperature and empirically derived coefficients as governed by $$\delta Ic = [p0 + p1 \times \log10(T)] \times \left( Iraw - \sum_{n=0,1,3,5} \left( a_n \times \left( \frac{T - T_{min}}{T_{max} - T_{min}} \right)^n \right) \right)$$

wherein $\delta Ic$ represents the change for a respective pixel from its dark level to a desired correction value, Iraw is the raw value of the pixel in digital numbers, $T_{max}$ and $T_{min}$ are maximum and minimum temperatures, respectively, for normalizing FPA temperature T, and p0, p1, and $a_0$, $a_1$, $a_3$, and $a_5$ are empirically derived coefficients.

7. The system as recited in claim 6, wherein there is no thermoelectric cooling device connected for temperature control of the FPA.

8. The system as recited in claim 7, wherein there is no temperature control device connected for temperature control of the FPA.

9. The system as recited in claim 6, wherein the function of the FPA temperature and empirically derived coefficients incorporates approximating change in a respective pixel's dark level to a desired correction value at the FPA temperature.

10. The system as recited in claim 6, wherein the FPA includes a buffered current mirror pixel architecture.

11. The system as recited in claim 6, wherein the FPA includes an InGaAs material for infrared imaging.

\* \* \* \* \*